United States Patent [19]

Matherne

[11] 3,810,383

[45] May 14, 1974

[54] COMPACT TUBING TESTING UNIT

[76] Inventor: Carrol J. Matherne, P.O. Box 763, Houma, La. 70360

[22] Filed: Mar. 17, 1972

[21] Appl. No.: 235,765

[52] U.S. Cl.................. 73/40.5 R, 73/49.1, 248/19
[51] Int. Cl. ............................................ G01m 3/08
[58] Field of Search............... 73/49.1, 40.5, 49.5 R; 248/19; 137/376

[56] References Cited
UNITED STATES PATENTS
3,495,443   2/1970   Phillips et al. .................... 73/40.5 R
3,710,628   1/1973   Horton.............................. 73/49.5
3,436,957   4/1969   Pridy................................ 73/40.5 R FOREIGN PATENTS OR APPLICATIONS
627,875   8/1949   Great Britain....................... 248/19

Primary Examiner—Richard C. Queisser
Assistant Examiner—Joseph W. Roskos
Attorney, Agent, or Firm—Clarence A. O'Brien; Harvey B. Jacobson

[57] ABSTRACT

A mobile unit for use in testing tubing joints as the tubing is being made up and run into an oil well in which the mobile unit includes a framework compactly receiving an engine driving a hydraulic pump, a drawworks, high pressure hydraulically actuated pump for pressuring the tubing joint to be tested and tubing tongs for use in making up the tubing. The frame also includes the compact arrangement of tanks for hydraulic fluid, water, compressed air tank and fuel tank for the engine and a hose rack for storage of the hoses employed and a bar rack along one side of the frame. This enables a single unit to be employed for effectively testing tubing and replaces four separate pieces of equipment now being employed in the industry for testing tubing.

12 Claims, 5 Drawing Figures

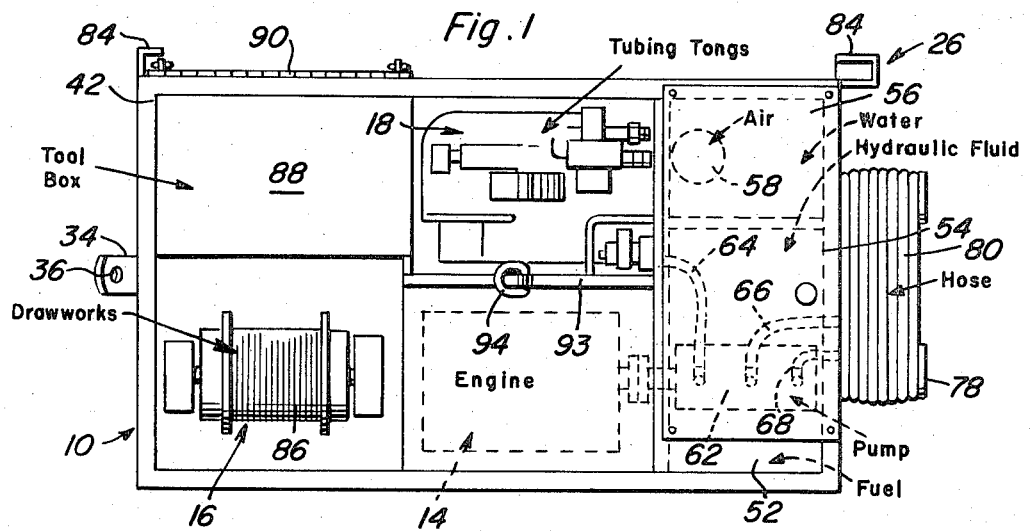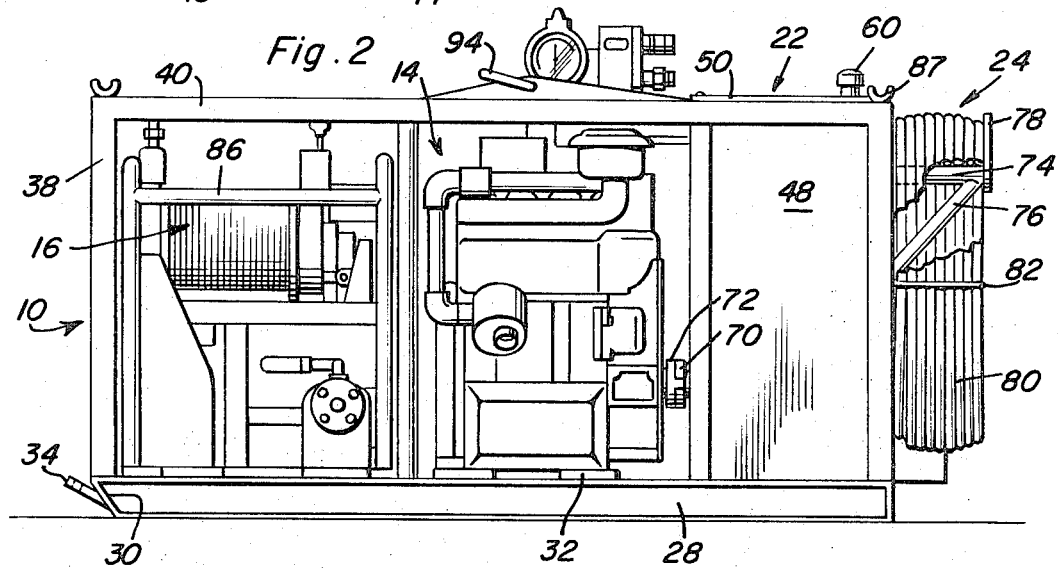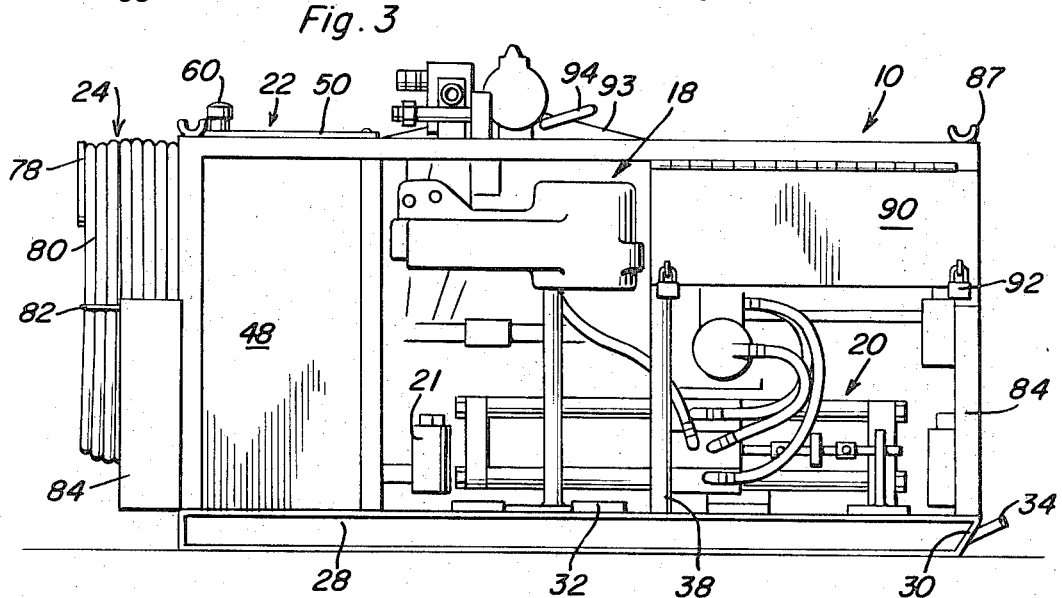

COMPACT TUBING TESTING UNIT

BACKGROUND OF THE INVENTION

1. Field of the Invention

The present invention generally relates to a pressure testing unit for tubing in an oil well and more particularly to a self-contained mobile unit having all of the equipment necessary to effectively test the tubing in a single compact assembly.

2. Description of the Prior Art

When tubing is made up and run into an oil well, it is pressure tested to assure that it will operate effectively under the pressures to be encountered without leakage. Present-day practice involves the use of four relatively large separate pieces of equipment including a motor driven drawworks, a motor driven tubing tong assembly, a motor pump unit and a hydraulically operated high pressure testing pump unit. Each of these units are usually self-contained and mounted on a skid, platform or the like and each of these separate units being rather large require that they be transported on rather large trucks, float-type trailer to a drilling rig or in the event they are being transported to an offshore rig, a work boat is required. Also, the separate units, each having its own motor requires substantial maintenance and also attention of an operator while the pieces of equipment are being used. Thus, while present arrangements have been used to some degree of success, the separate pieces of equipment are quite costly in initial cost and rather expensive to operate and maintain and also present many problems in transportation and location and operation at the site of the drill rig.

SUMMARY OF THE INVENTION

An object of the present invention is to provide a single mobile tubing testing unit that will replace all of the previously used separate units and include all of the necessary equipment for efficiently testing tubing with the unit including a rigid skid-mounted frame and including an overall size which is substantially the same size as a single piece of the four pieces of independent equipment which this unit replaces.

Another object of the invention is to provide a tubing testing unit that not only includes all of the equipment necessary for testing tubing but also tanks for supplying the necessary fluids for effectively testing tubing, a hose rack for the hoses necessary and a bar rack for supporting tool bar sections.

Still another feature of the invention is to provide a tubing testing unit in which the tubing tongs and drawworks may be replaced or interchanged so that different size tubing may be made up and tested.

Yet another feature of the invention is to provide a tubing testing unit which includes a compact arrangement of components which is completely self-contained to enable the unit to be transported on a relatively small truck or on a crew boat in the event of transport to an offshore rig which is a much smaller and much faster boat than a work boat which is required when four separate units are used to test tubing. This unit with a single motor requires substantially less maintenance, is less costly to operate and requires substantially less attention from an operator thereby enabling the testing operation to be more efficiently conducted with an expenditure of less time and labor.

These together with objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic top plan view of the tubing testing unit of the present invention illustrating the association of the components.

FIG. 2 is a side elevational view of the testing unit from the side thereof having the motor and drawworks associated therewith.

FIG. 3 is a side elevational view of the testing unit from the side opposite to FIG. 2 illustrating the association of the drawworks and the high pressure hydraulically actuated pump.

DESCRIPTION OF THE PREFERRED EMBODIMENT

Figure 5:
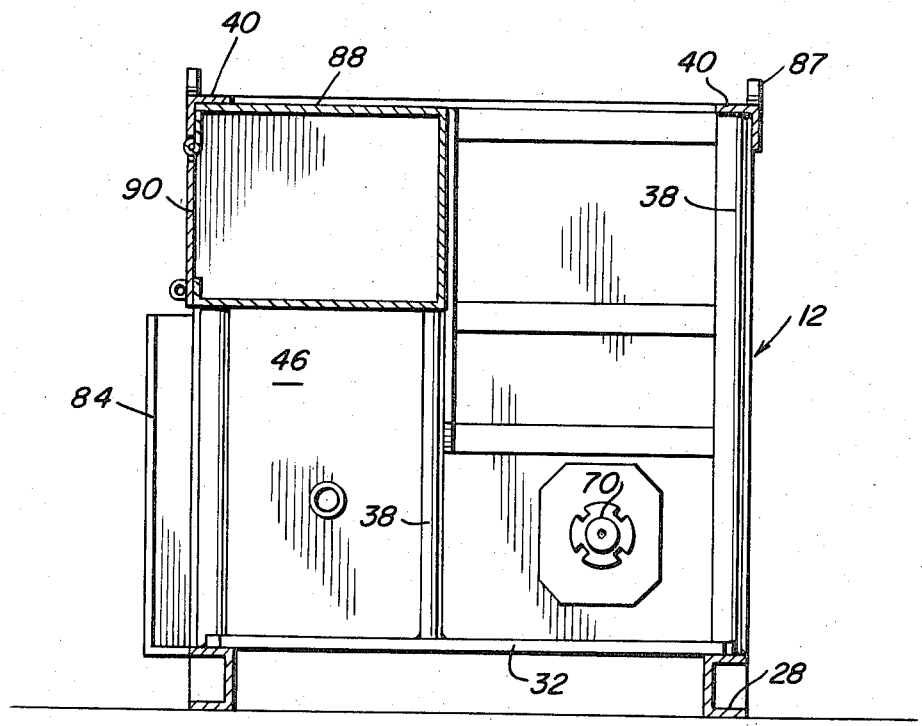
FIG. 5 is a transverse, sectional view taken substantially upon a plane passing along section line 5—5 of FIG. 4 illustrating further structural details of the frame.
Figure 4:
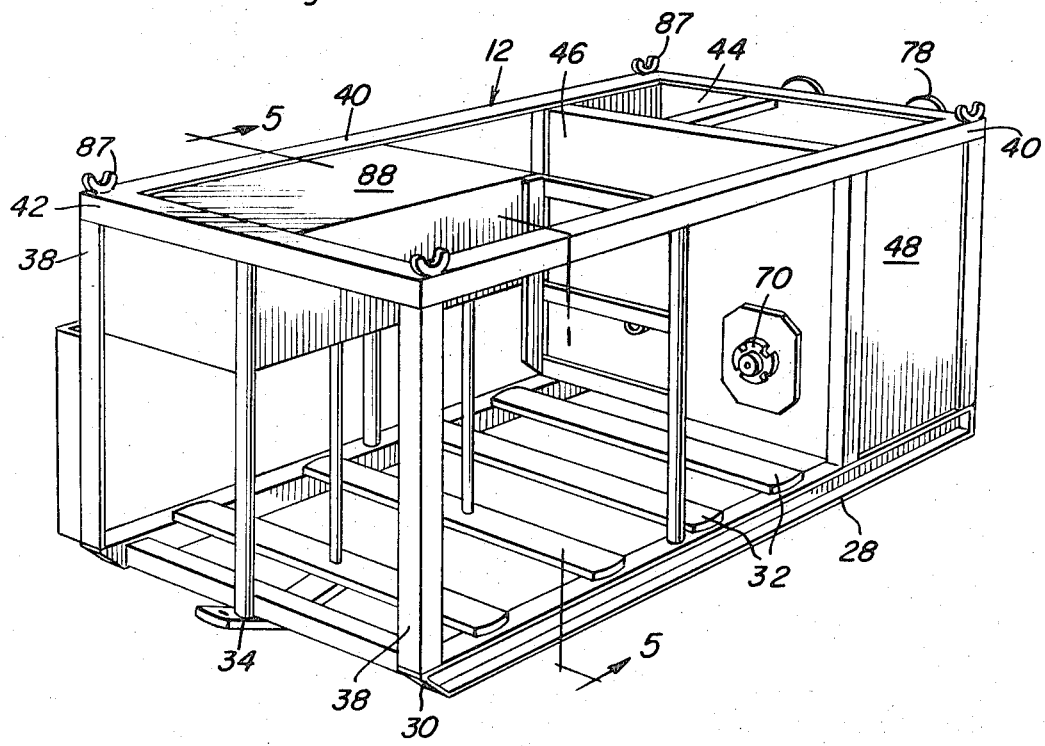
FIG. 4 is a perspective view of the frame prior to assembly of the testing equipment therein.

Referring now specifically to the drawings, the tubing testing unit of the present invention is generally designated by the numeral 10 and includes a rigid frame generally designated by the numeral 12 that receives and supports an engine 14, a drawworks or winch 16, tubing tongs 18 and a high pressure hydraulically actuated pump 20. At one end of the unit 10, a tank assembly 22 is provided and a hose rack assembly 24 is mounted on the end of the tank assembly and a bar rack 26 is mounted alongside of the unit having the tubing tongs 18 and hydraulically actuated reciprocating pump 20 thereon.

The frame 12 includes bottom longitudinal rigid members 28 that may conveniently be outwardly opening channel-shaped members having an inclined end 30 formed thereon to serve as a skid for the unit so that it may be towed along the ground surface. Rigidly connecting the longitudinal side members 28 is a plurality of transverse members 32 secured thereto such as by welding or the like. The forward transverse member 32 is provided with an upwardly projecting plate 34 having an aperture 36 therein by which a towing vehicle such as a truck, tractor or the like or other towing cable or apparatus may be attached for towing the unit to a desired location. While this structure is illustrated only on one end of the unit, it may be duplicated on the other end if desired.

Rigidly connected with the bottom runners or side members 28 are a plurality of vertical frame members 38 oriented at the corners and at intermediate portions of the frame with the upper ends of the vertical members 38 being rigidly connected with upper side frame members 40 and transverse frame members 42 all of which are rigidly interconnected in a manner to provide a rigid frame as illustrated in FIG. 5 with the components being of angle iron construction insofar as the peripheral frame members are concerned and tubular pipes, rods or the like insofar as the intermediate vertical members are concerned.

The rear portion of the frame includes a rear wall 44 and a partition wall 46 spaced therefrom which together with a bottom wall and side walls 48 define the tank area 22 with the tank area 22 being closed by a removable top plate 50 forming a closure for this space. The space defined by the walls 44, 46, 48 and 50 is divided into a plurality of vertical compartments by partitions which separate this space into a tank 52 for fuel oil, a tank 54 for hydraulic fluid and a tank 56 for water. Disposed in the tank 56 is a vertically disposed cylindrical air tank 58 for storing compressed air. The tanks 52, 54 and 56 are openable by removing the top plate to enable cleaning when desired and a filler cap 60 is provided on the tank 54 to replenish the supply of hydraulic fluid when desired. Disposed horizontally in the tank 54 adjacent the bottom thereof is a hydraulic pump 62 that is in the form of a triple pump arranged in a single housing that includes three discharge lines 64, 66 and 68 two of which connect with fittings on the rear wall 44 and one of which connects with a fitting on the front wall 46. The pump 62 includes a drive coupling 70 disposed forwardly of the front wall 46 for driving connection with the engine 14 as at 72 so that hydraulic fluid in the tank 54 will be pumped by the pump 62 that is immersed in the hydraulic fluid and discharged through the discharge lines 64–68 and the hydraulic fluid after it has been used for powering the latest equipment will be discharged back into the tank 54.

The rear wall 44 of the unit includes the hose rack 24 that is in the form of a pair of rigidly extending members 74 having an upwardly disposed curved surface and with the outer end thereof being braced by a diagonal brace 76. The outer end of each member 74 is provided with an offset circular plate 78 which serves to retain hoses 80 thereon in a spirally wound reel. The hoses 80 may be retained in position by a flexible chain or cable 82 having at least one end thereof detachably connected to the rear wall 44. The hoses 80 are of different colors and are provided with quick disconnect couplings to the fittings to supply hydraulic fluid to the equipment and return it to the tank.

The side of the unit having the tubing tongs 18 and hydraulically actuated high pressure pump 20 thereon has a bar rack incorporated therein in the form of vertically disposed angle irons 84 secured thereto with the angle irons opening toward each other and being closed at the bottom while open at the top to enable the long toolbar sections to be stored in this rack while the unit is being transported thus assuring that the bars will be available when placing the packer into the tubing by connection with the cable 86 on the drawworks 16 in a well known manner.

The upper corners of the frame each include a generally U-shaped saddle 87 rigid therewith which forms a positioning device for receiving a holddown chain or cable when the unit is mounted on a truck bed, boat or the like so that the holddown chain will be properly oriented in relation to the testing unit to retain it in position. At the corner of the frame having the hydraulically actuated high pressure pump 20 therein, a tool box is provided which includes a peripheral wall 88 including end walls, a top wall, inner wall and bottom wall and a hinged door 90 hinged along the top edge thereof and secured in position along the bottom edge thereof by suitable locks 92 or the like thereby providing a storage area for tools that are employed during the testing of tubing or which may be desired during operation of the device thereby assuring that such tools will be available and assuring the security of such tools.

The center top of the unit is provided with a rigid vertical plate 93 having a lifting loop or eye 94 attached thereto with this member being substantially in alignment with the center of gravity of the testing unit so that a hoist, crane or other lifting device may be employed to lift the unit in its entirety onto a small truck, boat or the like or remove it from such a vehicle at the job site.

The engine 14 which is used is a compact diesel engine that is a commercially available air cooled engine that is started by hand cranking. The engine is provided with a small air compressor which is driven off of the front end of the engine to replenish the air supply in the air tank 58. This arrangement which is conventional in and of itself enables the engine to be started without depending upon a source of electrical power such as a battery to drive an electric starter thereby simplifying operation of the device and assuring that the engine will be capable of being started by hand cranking. This type of engine also eliminates the necessity of providing a large radiator for supplying cooling liquid. Also, the engine is secured in place in a conventional and well known manner and includes all of the components that normally is provided on this type of engine and may be purchased as a unit and dropped into the frame, anchored in place and connected to the drive connection 70.

The drawworks 16 are also conventional and driven by a hydraulically powered motor that is supplied from the pump 62 through a hose 80 connected with the discharge outlet 66 with, of course, the hydraulic fluid also being returned to the hydraulic tank 54 in a suitable manner. The drawworks 16 is in the form of a winch with a cable thereon and a connector for connection with the tool bars for manipulating the packer in relation to the tubing in a well known manner. A suitable control valve is provided for manipulating the drawworks and the drawworks may be interchanged with other drawworks to enable the testing of different tubing by employing different packers and bars.

The tubing tongs 18 are also conventional in construction and operation and are hydraulically powered and supplied with hydraulic fluid from the pump 62 through the discharge line 68 and one of the hoses 80 with the hydraulic fluid also being returned to the tank 54. The tubing tongs are operated in a conventional manner to make up the tubing as it is being run into the well and tested hydrostatically as it is made up and run into the well. The tubing tongs are conventional and commercially available and are removable from the unit but, of course, are secured fixedly in place when being used and are provided with the usual appropriate controls and connected with the hydraulic fluid through quick disconnect couplings and high pressure hoses. The testing unit may also be used with or without the tongs. The hydraulically actuated pump 20 is also powered from the hydraulic pump 62 through the discharge line 64 and is also provided with a return flow back to the hydraulic tank 54. The high pressure pump is of a conventional reciprocating type which produces water under high pressure to the tubing being tested and thus has communication with the water tank 56 which serves as a source of water and a return tank.

The water tank may be filled from any suitable source and may be emptied when the device is being transported to reduce the overall weight thereof. The pressure pump 20 being positioned generally below the top of the water level in the water tank 56 will not lose prime thus eliminating any loss of time which may occur if the high pressure pump was obtaining water from a tank below the level of the pump. The hydraulic high pressure pump 20 includes check valve assemblies 21 that include an integral seat and body to reduce the possibility of leakage through the check valve and includes a minimum number of connections in the high pressure water lines and employs high pressure hose in lieu of rigid pipe connections which are subject to leakage due to vibration and weak joints and the like.

This device may be transported on a relatively small truck such as a flat bed truck or on a crew boat rather than on a float trailer or work boat and provides a compact unit that is easily handled, loaded, unloaded and set up and is quite flexible in use in that various types and sizes of tubing may be tested by changing the tool and packers as well as the bars and additional drawworks can be sent out to a job in order to enable two different sizes of tubing to be tested simultaneously. In actual use of this invention, the testing unit has run up to 20,000 feet of tubing and tested it in a period of approximately 13 hours which is indicative of the efficient manner in which the unit runs and tests tubing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A compact, self-contained tubing testing and assembling unit comprising a portable frame, a plurality of vertically disposed fluid receiving tanks along one end of the frame one of which tanks receives a quantity of hydraulic fluid therein and another of said tanks receives a quantity of water therein, a multiple pump assembly disposed in the hydraulic fluid tank below the hydraulic fluid level therein, said pump assembly including drive means extending interiorly of the hydraulic fluid tank, a motor on said frame drivingly connected to said drive means, a drawworks for raising and lowering a testing tool in a pipe to be tested, tubing tongs for making up and breaking down pipe and a high pressure reciprocating test pump for delivering water under high pressure from said water tank to said testing tool, said drawworks, tubing tongs and high pressure pump carried by said portable frame and each independently driven by the multiple pump assembly with hydraulic fluid from said hydraulic fluid tank supplied separately to each of said drawworks, tubing tongs and high pressure reciprocating pump for operation without external power sources.

2. The structure as defined in claim 1 together with a hose rack on the outer end wall of the fluid tanks, said hose rack including a pair of horizontally spaced projecting members on said end wall, an offset plate on the outer end of each of said projecting members to retain hoses looped around the projecting members, and a tool bar rack along one side of the frame, said tool bar rack being on the side of the frame having the tubing tongs and high pressure pump thereon.

3. The structure as defined in claim 1 wherein said frame includes vertical frame members defining vertical compartments for receiving the drawworks and tubing tongs to enable the tubing tongs and drawworks to be interchanged with others.

4. The structure as defined in claim 1 wherein said frame includes substantially U-shaped saddles at each upper corner thereof adapted to receive holddown chains, one corner of said frame including a closed compartment having a pivotal door thereon forming a tool holder, a hose rack on the other end wall of the fluid tanks, said hose rack including a pair of horizontally spaced projecting members on said end wall, an offset vertical plate on the outer end of each of said projecting members to retain hoses looped around the projecting members, a tool bar rack along one side of the frame, said tool bar rack being on the side of the frame having the tubing tongs and high pressure pump thereon and including upwardly opening, vertically elongated pockets oriented in facing relation to each other to receive a plurality of tool bars, said frame including a pair of bottom, longitudinally extending skids having an inclined end to enable the frame to be pulled along a supporting surface to a desired location, a centrally disposed lift ring mounted on the top of said frame for engagement with a lifting device with the testing unit being substantially symmetrical about the lift ring to enable the testing unit to be hoisted by a single lift member.

5. The structure as defined in claim 4 wherein another of said tanks is provided with fuel for the motor and an air reservoir is disposed in the water tank communicated with an air compressor driven by the motor, said water tank having at least a portion thereof above the high pressure pump to eliminate the possibility of the high pressure pump losing prime.

6. The structure as defined in claim 1 wherein another of said tanks is provided with fuel for the motor and said water tank has at least a portion thereof oriented above the intake of the high pressure pump to eliminate the possibility of the high pressure pump losing prime, said tanks extending substantially the full vertical height of the frame and extending substantially completely across one end thereof with the motor and drawworks being substantially in longitudinal alignment along one side of the frame and the tubing tongs and high pressure reciprocating pump being in longitudinal alignment along the other side of the frame, said frame including vertically arranged open areas receiving the tubing tongs and drawworks to enable tubing having different characteristics to be tested by this unit.

7. The structure as defined in claim 1 wherein said portable frame includes a skid and peripheral frame members defining a generally rectangular block shape which substantially encompasses said plurality of vertically disposed fluid receiving tanks, said multiple pump assembly, said motor, said drawworks, said tubing tongs and said high pressure reciprocating test pump all as carried by said frame.

8. A compact, self-contained pipe testing unit comprising a portable rigid frame having a skid and peripheral frame members which define a substantially rectangular block shape, a series of components for hydraulically testing pipe supported by said frame and substantially contained within said block shape whereby said components will be protected by said frame, said components including at least two vertically disposing fluid receiving tanks along one end of the frame, one of which contains a quantity of hydraulic fluid and the other a quantity of water, a multiple pump and motor assembly for supplying hydraulic fluid from said hydraulic fluid tank, and a high pressure reciprocating test pump connected to said water tank, said high pressure reciprocating pump being driven by hydraulic fluid supplied by the multiple pump assembly from said hydraulic fluid tank to pump water from said water tank under high pressure for pipe testing.

9. The structure as defined in claim 8 wherein said tanks includes a pair of projecting members on an outer wall thereof defining a hose rack on which high pressure hose may be stored, said frame including vertical members defining vertical guides to removably support and enable interchange of testing equipment.

10. The structure as defined in claim 9 wherein said multiple tank assembly also includes a fuel tank for supplying fuel to a drive motor of said multiple pump and motor assembly and a water tank for supplying water to the testing equipment, said pump being disposed adjacent the bottom portion of the tank in which it is located to substantially eliminate possibility of the pump losing prime, substantially eliminate rust and corrosion from the pump and to prevent maladjustment thereof, said testing unit including the testing equipment and motor being completely self-contained and completely independent of any external source of power.

11. A compact, self-contained pipe testing unit comprising a portable rigid frame having a skid and peripheral frame member, a plurality of vertically disposed fluid receiving tanks supported on said frame, one of which tanks contains a quantity of hydraulic fluid therein and another of said tanks contains a quantity of water therein, a multiple pump assembly disposed in the hydraulic fluid tank below the hydraulic fluid level therein, said pump assembly including drive means extending interiorly of the hydraulic fluid tank, a motor on said frame drivingly connected to said drive means, a high pressure reciprocating test pump carried by said portable frame and operated with hydraulic fluid supplied from said hydraulic fluid tank by said multiple pump assembly, said high pressure reciprocating test pump adapted to deliver water under high pressure from said water tank to at least one pipe testing tool, at least one draw-works carried by said portable frame and operated with hydraulic fluid supplied from said hydraulic fluid tank by said multiple pump assembly, said draw-works adapted to raise and lower said at least one pipe testing tool in a pipe to be tested.

12. The structure in accordance with claim 11 wherein a second draw-works for raising and lowering a second pipe testing tool is operated with hydraulic fluid from said hydraulic fluid tank by said multiple pump assembly and water under high pressure from said water tank is delivered by said high pressure reciprocating test pump to said second pipe testing tool in addition to the said at least one pipe testing tool whereby two different sizes of pipe may be tested simultaneously.

* * * * *